J. A. LELAND.
SPIRAL SCREW DRIVER.
APPLICATION FILED DEC. 8, 1908.
942,571.
Patented Dec. 7, 1909.
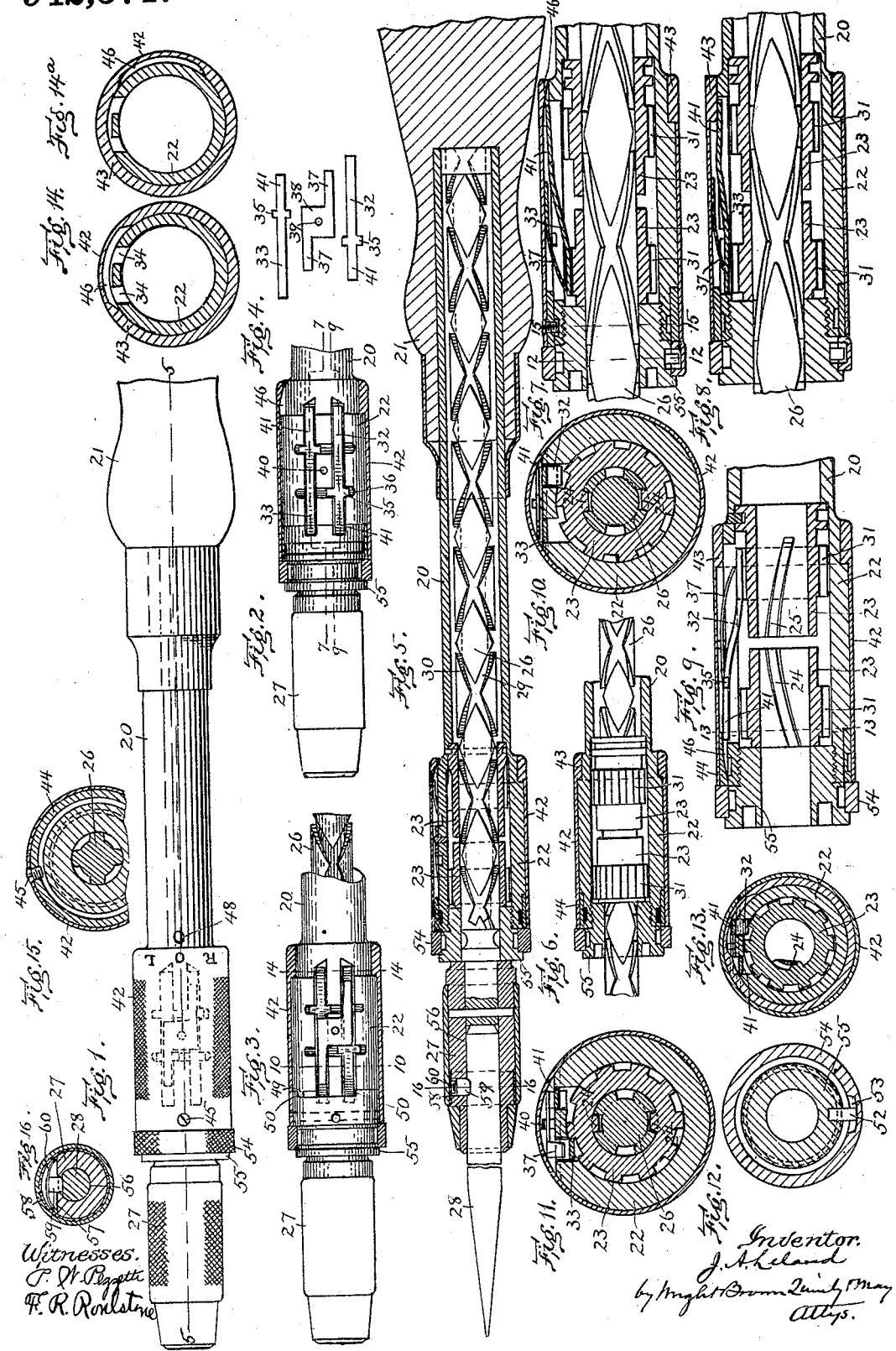

UNITED STATES PATENT OFFICE.

JOHN A. LELAND, OF MONTAGUE, MASSACHUSETTS, ASSIGNOR TO MILLERS FALLS COMPANY, OF MILLERS FALLS, MASSACHUSETTS, A CORPORATION OF MASSACHUSETTS.

SPIRAL SCREW-DRIVER.

942,571.   Specification of Letters Patent.   Patented Dec. 7, 1909.

Application filed December 8, 1908. Serial No. 466,512.

*To all whom it may concern:*

Be it known that I, JOHN A. LELAND, of Montague, in the county of Franklin and State of Massachusetts, have invented certain new and useful Improvements in Spiral Screw-Drivers, of which the following is a specification.

This invention relates to a so-called spiral screw-driver which includes a tubular holder adapted to be manipulated by the operator, and a shank carrying a screw-driver or other tool, and movable endwise in the tubular holder, the shank being helically grooved and the holder having means for engaging the grooved shank and causing the shank to rotate when it is moved inwardly into the holder.

The invention has for its object to provide improved means for causing a rotation of the shank and tool in either direction when it is moved inwardly into the holder, so that the tool may turn either to the right or to the left; and also to provide means for preventing the rotation of the shank in either direction, and at the same time prevent its endwise movement into the holder, so that the shank may be supported at any desired projection from the holder and used as the shank of an ordinary screw-driver, rotatable by the rotation of the holder.

The invention consists in the several improvements which I will now proceed to describe and claim.

Of the accompanying drawings, forming a part of this specification,—Figure 1 represents a side elevation of a screw-driver embodying my invention, the end portions being broken away. Fig. 2 represents a view similar to a portion of Fig. 1, the pawl operating springs being omitted, and a portion of the holder being shown in section. Fig. 3 represents a view similar to Fig. 2, showing the pawl operating springs in place. Fig. 4 represents the pawls and their operating springs disconnected. Fig. 5 represents a section on line 5—5 of Fig. 1. Fig. 6 represents a partial sectional view of the holder, and a side elevation of a portion of the shank and the collars thereon. Fig. 7 represents a section on line 7—7 of Fig. 2, showing one of the pawls projected. Fig. 8 represents a view similar to Fig. 7, the pawl represented in said figure being retracted. Fig. 9 represents a section on line 9—9 of Fig. 2, the tool-carrying shank being removed. Fig. 10 represents a section on line 10—10 of Fig. 3. Fig. 11 represents a view similar to Fig. 10, showing a different adjustment of the pawls. Fig. 12 represents a section on line 12—12 of Fig. 7. Fig. 13 represents a section on line 13—13 of Fig. 9. Fig. 14 represents a sectional view of the holder and the sleeve thereon taken on line 14—14 of Fig. 3, the tool-carrying shank and its collars being removed. Fig. 14$^a$ represents a view similar to Fig. 14, showing a different adjustment of the sleeve. Fig. 15 represents a section on line 15—15 of Fig. 7. Fig. 16 represents a section on line 16—16 of Fig. 5.

The same reference characters indicate the same parts in all the figures.

In the drawings, 20 represents a tubular holder provided at one end with a handle 21, and at or near its opposite end with an enlargement 22, in which are rotatively mounted or journaled two collars 23. As shown in Fig. 9, one of said collars is provided internally with an inclined rib 24, and the other with an inclined rib 25, each rib being a segment of a helix, and one rib having an inclination opposite that of the other. In practice, each collar may have two ribs located at opposite sides of the collar, the two ribs of each collar having the same inclination.

26 represents a tool-carrying shank which is adapted both to rotate and to move endwise in the holder 20, the shank being provided at its outer end with a suitable chuck 27 adapted to hold a screw-driver blade 28, or other tool. The shank 26 is provided with two helical grooves 29 and 30, said grooves being of opposite inclination and intersecting each other at numerous points, as shown in Figs. 5, 6, 7, and 8. The groove 29 is engaged with the rib 24, and the groove 30 is engaged with the rib 25, so that when the collars 23 are both free to rotate loosely and the shank 26 is moved inwardly into the holder 20, one of the grooves will rotate the collar having the rib 24 in one direction, and at the same time the other groove will rotate the collar having the rib 25 in the opposite direction. In practice, however, the collars 23 are not both free to rotate loosely at any time, means being provided, as hereinafter described, for locking either collar against the rotation which would be imparted to it by an inward movement of the shank 26, the other collar being left loose. It follows, therefore, that a rotary movement in either direction may be imparted to the shank 26 and the tool carried thereby, by moving it into the holder, one of the collars being locked and the other loose. For example, a right hand rotation may be imparted to the shank by pushing it into the holder when the collar having the rib 25 is locked and the collar having the rib 24 is loose, this rotation being effected by the engagement of the locked rib 25 with the groove 30 in the tool shank. A left hand rotation may be imparted to the shank by pushing it into the holder when the collar having the rib 24 is locked, the other collar being loose.

Provision is made in accordance with my invention for locking both of the collars simultaneously against the rotation which would be imparted to it by an inward movement of the tool-shank, and thus preventing such inward movement, the shank being rigidly supported against inward movement by the locked rigs 24 and 25, so that the tool is adapted to be used as a screw-driver to be rotated by hand in the usual way. The means here shown for locking the collars 23 and their ribs 24 and 25 comprise ratchet teeth 31 formed externally on the collars 23, said teeth being preferably provided with radial edges, as shown in Figs. 10, 11, and 13, and pawls 32 and 33 which are fulcrumed on the enlargement 22 of the holder, and are adapted to swing toward and from the ratchets 31 through slots 34 (Fig. 14) formed in one side of said enlargement. Each pawl is provided with trunnions 35 which are inserted in transverse sockets 36 in the enlargement 22, and connecting the slots 34 a rocking connection being thus established between the pawls and the holder. Springs 37 are provided which are adapted to normally project the pawls inwardly into engagement with the ratchets, said springs being preferably formed in a single piece connected by a neck 38 which has a hole 39 to receive a retaining stud 40 on the holder. Each pawl is provided with an operating arm 41 which is normally forced outwardly from the enlargement 22 by the action of the spring 37, the pawl being at one side of the trunnions 35, and the operating arm at the opposite side, so that the spring 37 in forcing the pawl inwardly against the accompanying ratchets, forces the operating arm 41 outwardly. The relative arrangement of the pawls, operating arms, trunnions, and springs is shown in Figs. 2 and 3, one of the operating arms projecting toward the handle end of the holder, while the other operating arm projects toward the outer end of the handle.

42 represents a sleeve which is mounted to have a limited rotary movement on the enlargement 22 of the holder, said sleeve having end portions 43 and 44, which have a sliding fit on the periphery of the enlargement 22, the end portion 43 being preferably a thickened integral portion of the sleeve, while the end portion 44 is formed by securing a ring to the interior of the sleeve by means of a screw 45 (Fig. 15). The said ring occupies a recess formed for its reception in the periphery of the enlargement 22, and when attached to the sleeve 42 by the screw 45, prevents endwise movement of the sleeve toward the handle 21. When the screw 45 is removed, the body portion of the sleeve 42 may be removed from the enlargement to permit access to the pawls and their springs. Each of the end portions 43 is provided internally with a segmental recess 46 (see Figs. 14 and 14ᵃ). The recess 46 in one of the end portions of the sleeve is adapted to coöperate with the operating arm 41 of one of the pawls, while the recess 46 in the opposite end portion of the sleeve is adapted to coöperate with the operating arm 41 of the other pawl. When the recess 46 is in the position shown in Fig. 14, it permits the outward movement of the corresponding operating arm, and the projection of the pawl connected therewith, into engagement with the accompanying ratchet by the spring 37. When the recess is in the position shown in Fig. 14ᵃ, the inner surface of the end portion of the sleeve in which said recess is formed forces the operating arm inwardly, and thus forces outwardly or retracts the accompanying pawl. The relative arrangement of the recesses in the two end portions of the sleeve 42 is such that when the sleeve is turned to one extreme of its movement, the operating arm of one of the pawls will be forced inwardly to retract its pawl, and the other operating arm will be allowed to spring outwardly into a recess 46, so that the accompanying pawl is projected into engagement with its ratchet. When the sleeve is turned to the opposite extreme of its movement, the conditions are reversed, the locking arm which was before pressed inwardly being released, and the opposite arm pressed inwardly. When the sleeve 42 is in an intermediate position, the operating arms of both pawls are released and forced outwardly so that the two pawls engage their ratchets simultaneously.

As shown in Fig. 1, the sleeve and the holder are provided respectively with indicating marks or characters, which as here shown, comprises a zero mark 48 on the holder, and the letters "R" and "L", and a zero mark between them on the sleeve. The rotary movements of the sleeve are limited by suitable stop devices, which as here shown, comprise a finger 49 (Fig. 3) on the enlargement 22, and a recess formed in the inner edge of the ring constituting the end portion 44 of the sleeve, the ends of said recess forming stop shoulders 50 adapted to abut against the stop finger 49. The indicating characters on the holder and sleeve are so arranged that when the two zero marks coincide, as shown in Fig. 1, both pawls are engaged with the accompanying ratchets, so that the shank 26 is locked against inward movement relatively to the holder, the shank being thus adapted to be turned with the holder, the device, as a whole, operating like an ordinary hand screw-driver. When the character "R" on the sleeve coincides with the zero mark 48, the pawl which locks the sleeve having the rib 25 is made operative; consequently, a relative inward movement of the shank 26 will cause a right hand rotation of the shank. When the letter "L" on the sleeve coincides with the zero mark 48, the condition of the pawls is reversed, and the sleeve containing the rib 24 is locked so that an inward movement of the shank causes its rotation toward the left.

I have alluded to an inward movement of the tool-carrying shank relatively to the sleeve, but it will be understood that in practice, when the tool carried by the shank is engaged with a screw or other object, the holder will be moved endwise, the operator grasping the chuck 27 in one hand and the handle 21 in the other hand, and imparting a reciprocating movement to the handle and to the holder 20. Each pawl is adapted to engage the accompanying ratchet in one direction only, consequently, when the holder is moved backwardly upon the shank, the projected pawl slips and permits the free rotation of the sleeve-carrying operating rib. In other words, the tool-carrying shank is rotated only during a forward movement of the holder upon it, and is not rotated during the backward movement of the holder.

The outer end of the holder 20 is formed by an externally threaded bushing 55 (Fig. 9) screwed into the internally threaded outer end of the enlargement 22, said bushing being removable to permit the insertion and removal of the collars 23. A milled ring 54 surrounds the bushing 55, and has a recess 53 (Fig. 12) which engages a pin 52 on the bushing. The ring 54 enables the bushing to be rotated to apply and remove it.

The chuck 27 has a socket 56 for the reception of the tool 28. The body of the chuck has a transverse slot 57 (Fig. 16) which is covered by a band 58, said slot and band forming a chamber having angles which engage the ends of a curved spring 60, to which is attached a tool-locking pin 59.

I claim:

1. A tool of the character described comprising a tubular holder, a tool carrying shaft movable therein and provided with oppositely inclined intersecting helical grooves, collars rotatably mounted in said holder and each provided with an internal rib engaging one of said grooves said collars being also provided with external ratchet teeth, pawls arranged to engage said teeth, said pawls being placed side by side and extended in opposite directions, a normally immovable single spring held in position within said holder and engaging both pawls, to hold said pawls normally out of engagement with said ratchets, and an operating sleeve for said pawls mounted upon said holder.

2. A tool of the character described comprising a tubular holder, a tool carrying shaft movable therein and provided with oppositely inclined intersecting helical grooves, collars rotatably mounted in said holder and each provided with an internal rib engaging one of said grooves, said collars being also provided with external ratchet teeth, pawls arranged to engage said teeth, said pawls being placed side by side and extended in opposite directions, a normally immovable spring formed with a body portion held between said pawls and provided with oppositely projected arms extended over said pawls and parallel therewith, and an operating sleeve for said pawls mounted upon said holder.

3. A tool of the character described comprising a tubular holder, a tool carrying shaft movable therein and provided with oppositely inclined intersecting helical grooves, collars rotatably mounted in said holder and each provided with an internal rib engaging one of said grooves, said collars being also provided with external ratchet teeth, pawls arranged to engage said teeth, said pawls being placed side by side and extended in opposite directions, a flat plate spring formed of a substantially S-shaped plate, the arms of which are arranged to engage said pawls, and a sleeve for controlling the operation of said pawls.

4. A tool of the character described, comprising a tubular holder provided with longitudinal slots arranged side by side, a tool carrying shaft mounted in said holder and provided with oppositely inclined intersecting helical grooves, collars rotatably mounted in said holder and each provided with means for engaging one of said grooves, said collars being also provided with external ratchet teeth, pawls mounted in said slots and arranged to engage said ratchets, a spring secured between said slots and engaging both pawls, and means for operating said pawls.

5. A tool of the character described, comprising a tubular holder provided with longitudinal slots arranged side by side and connected by transverse sockets, a tool carrying shaft mounted in said holder and provided with oppositely inclined intersecting helical grooves, collars rotatably mounted in said holder and each provided with means for engaging one of said grooves, said collars being also provided with external ratchet teeth, pawls mounted in said slots and having trunnions engaging said transverse sockets, a spring engaging said pawls, and means for operating said pawls.

6. A tool of the character described, comprising a tubular holder provided with longitudinal slots arranged side by side and connected by transverse sockets, a tool carrying shaft mounted in said holder and provided with oppositely inclined intersecting helical grooves, collars rotatably mounted in said holder and each provided with means for engaging one of said grooves, said collars being also provided with external ratchet teeth, pawls mounted in said slots and having trunnions engaging said transverse sockets, a spring having a body portion secured in position between said slots and sockets and provided with arms to engage said pawls, and means for operating said pawls.

In testimony whereof I have affixed my signature, in presence of two witnesses.

JOHN A. LELAND.

Witnesses:
LIZZIE B. STRACHAN,
K. E. NICHOLS.